United States Patent
Okazoe et al.

(10) Patent No.: US 9,332,543 B2
(45) Date of Patent: May 3, 2016

(54) MOBILE RADIO DEVICE AND DETERMINING METHOD

(71) Applicant: FUJITSU LIMITED, Kawasaki-shi (JP)

(72) Inventors: Shinsuke Okazoe, Yokohama (JP); Hirotoshi Shimizu, Yokohama (JP); Yoji Sugawara, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 501 days.

(21) Appl. No.: 13/686,239

(22) Filed: Nov. 27, 2012

(65) Prior Publication Data

US 2013/0244677 A1 Sep. 19, 2013

(30) Foreign Application Priority Data

Mar. 19, 2012 (JP) ................. 2012-062394

(51) Int. Cl.
*H04W 72/00* (2009.01)
*H04W 72/04* (2009.01)
*H04W 52/02* (2009.01)
*H04W 64/00* (2009.01)

(52) U.S. Cl.
CPC ...... *H04W 72/0453* (2013.01); *H04W 52/0209* (2013.01); *H04W 64/006* (2013.01)

(58) Field of Classification Search
CPC .............................. H04W 24/00; H04W 72/082
USPC ............ 455/452.1, 441, 404.2, 405, 407, 425
See application file for complete search history.

(56) References Cited

U.S. PATENT DOCUMENTS

| 7,280,835 B2 * | 10/2007 | Usuda et al. ................. 455/450 |
| 7,702,354 B2 | 4/2010 | Kawasaki |
| 2006/0025153 A1 | 2/2006 | Inaba |
| 2012/0314588 A1 * | 12/2012 | Nammi ........................ 370/252 |

FOREIGN PATENT DOCUMENTS

| JP | 10-138594 | 5/1998 |
| JP | 2006-33207 | 2/2006 |
| JP | 2006-74265 | 3/2006 |
| JP | 2008-278076 | 11/2008 |
| JP | 2008-300923 | 12/2008 |
| JP | 2009115714 A * | 5/2009 |
| WO | WO-2006/077647 | 7/2006 |

* cited by examiner

*Primary Examiner* — Chuck Huynh
(74) *Attorney, Agent, or Firm* — Fujitsu Patent Center

(57) ABSTRACT

A mobile radio device capable of receiving a radio signal whose frequency band switches, includes a setting unit that when the frequency band of the radio signal is a first frequency band, sets a first threshold corresponding to the first frequency band, and that when the frequency band switches from the first frequency band to a second frequency band different from the first frequency band, sets for a given period, a third threshold that is between the first threshold and a second threshold corresponding to the second frequency band and subsequently sets the second threshold; and a determining unit that determines a travel speed of the mobile radio device, based on a comparison of a moving average obtained by temporally accumulating variations of estimates of propagation characteristics of the radio signal and averaging the accumulated variations by a moving average method using a threshold set by the setting unit.

12 Claims, 12 Drawing Sheets

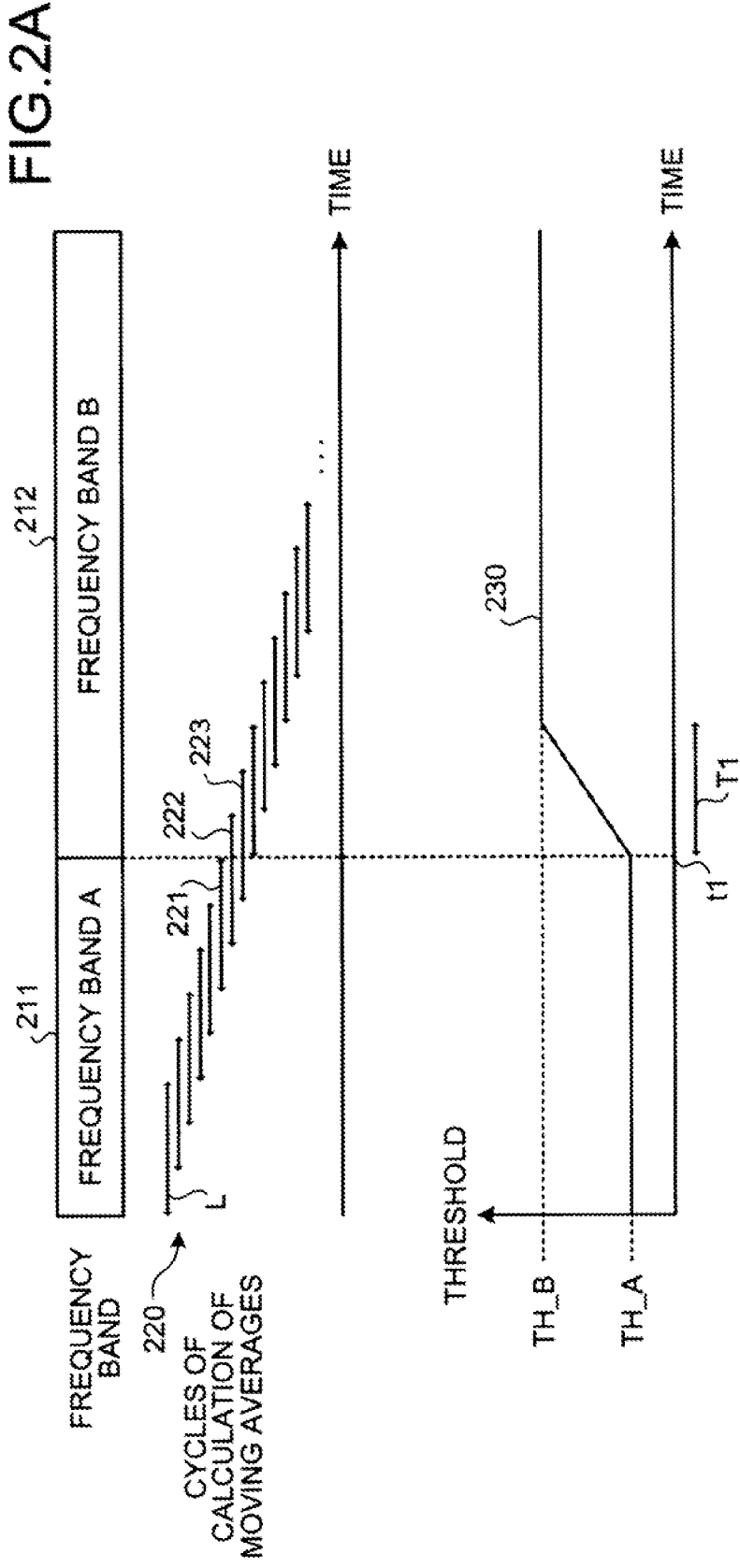

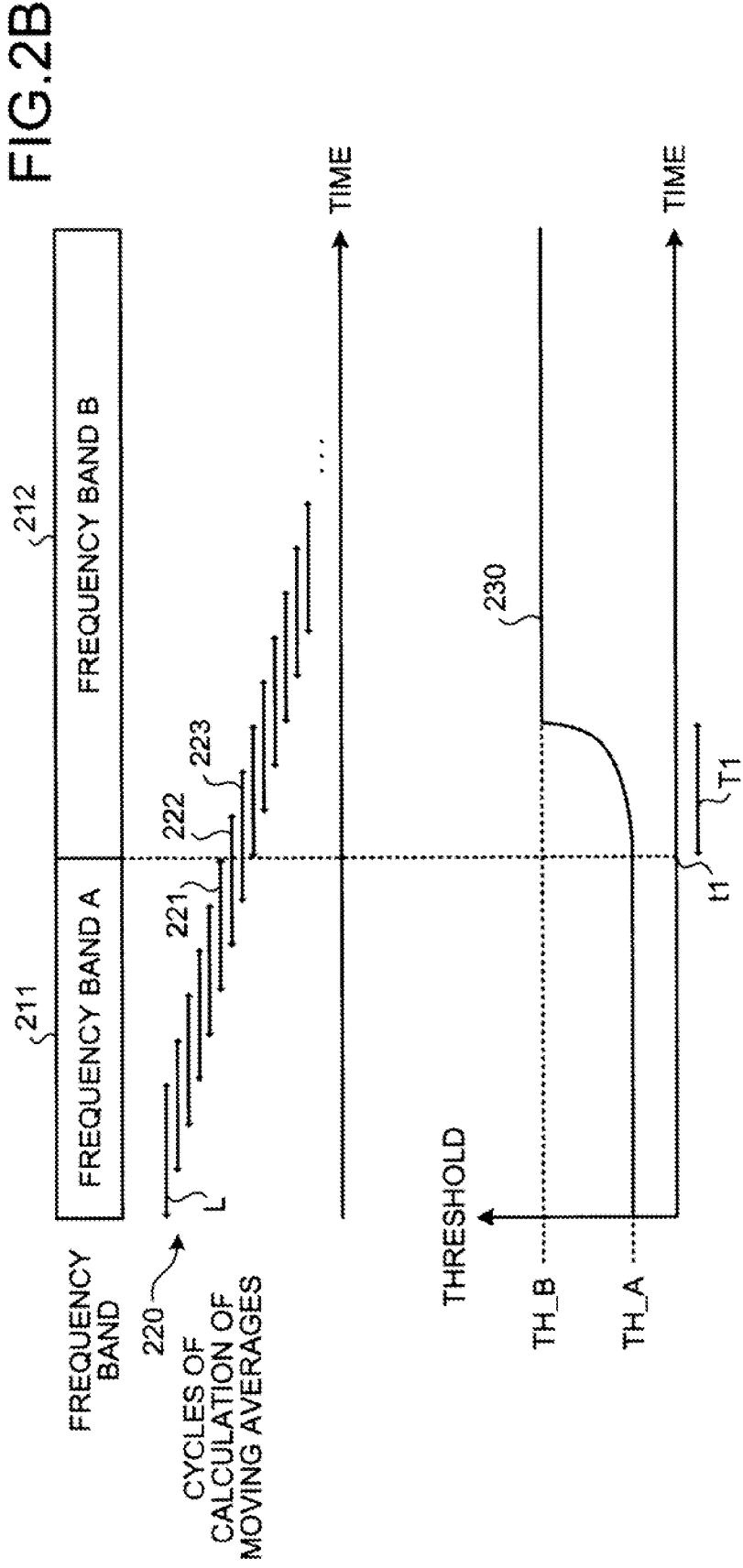

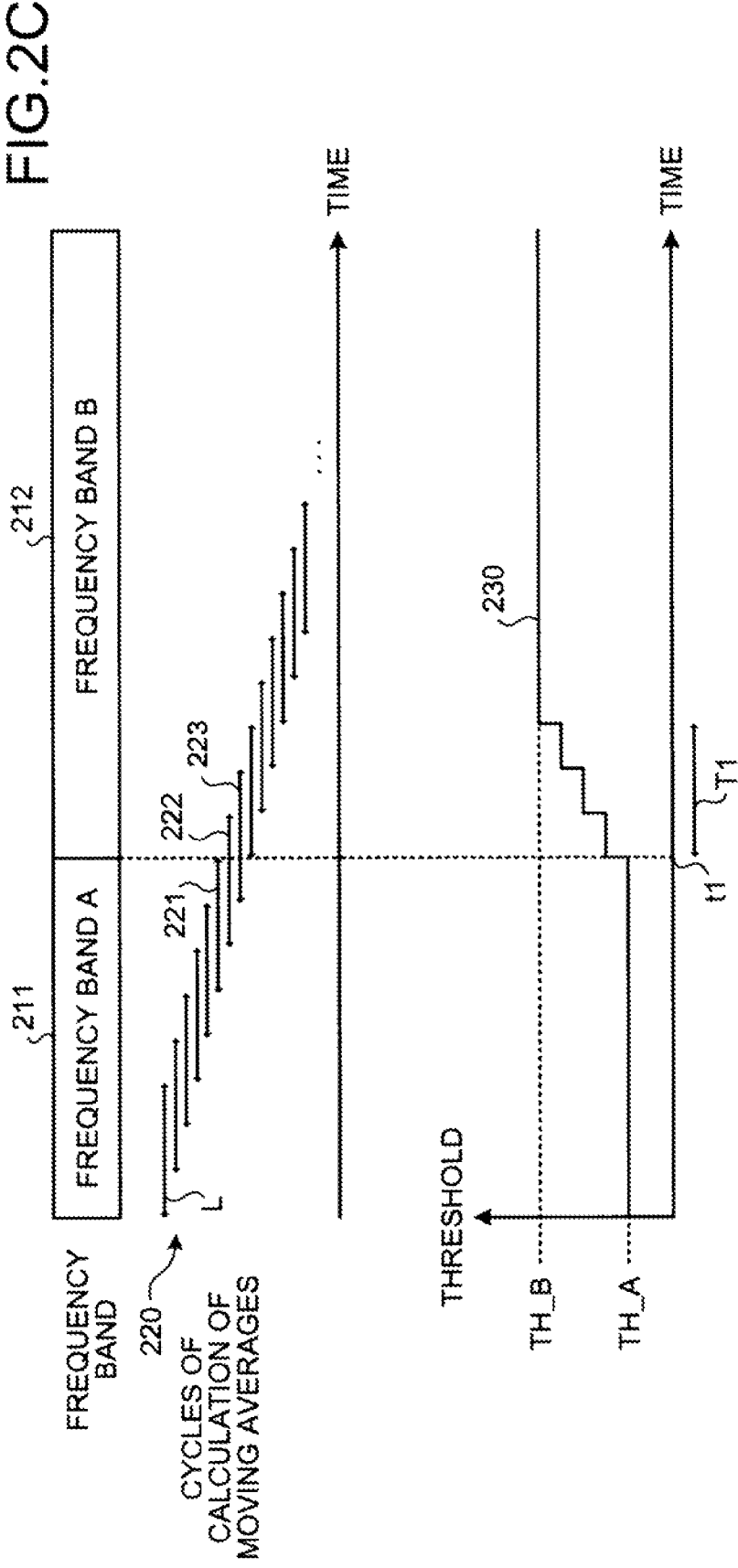

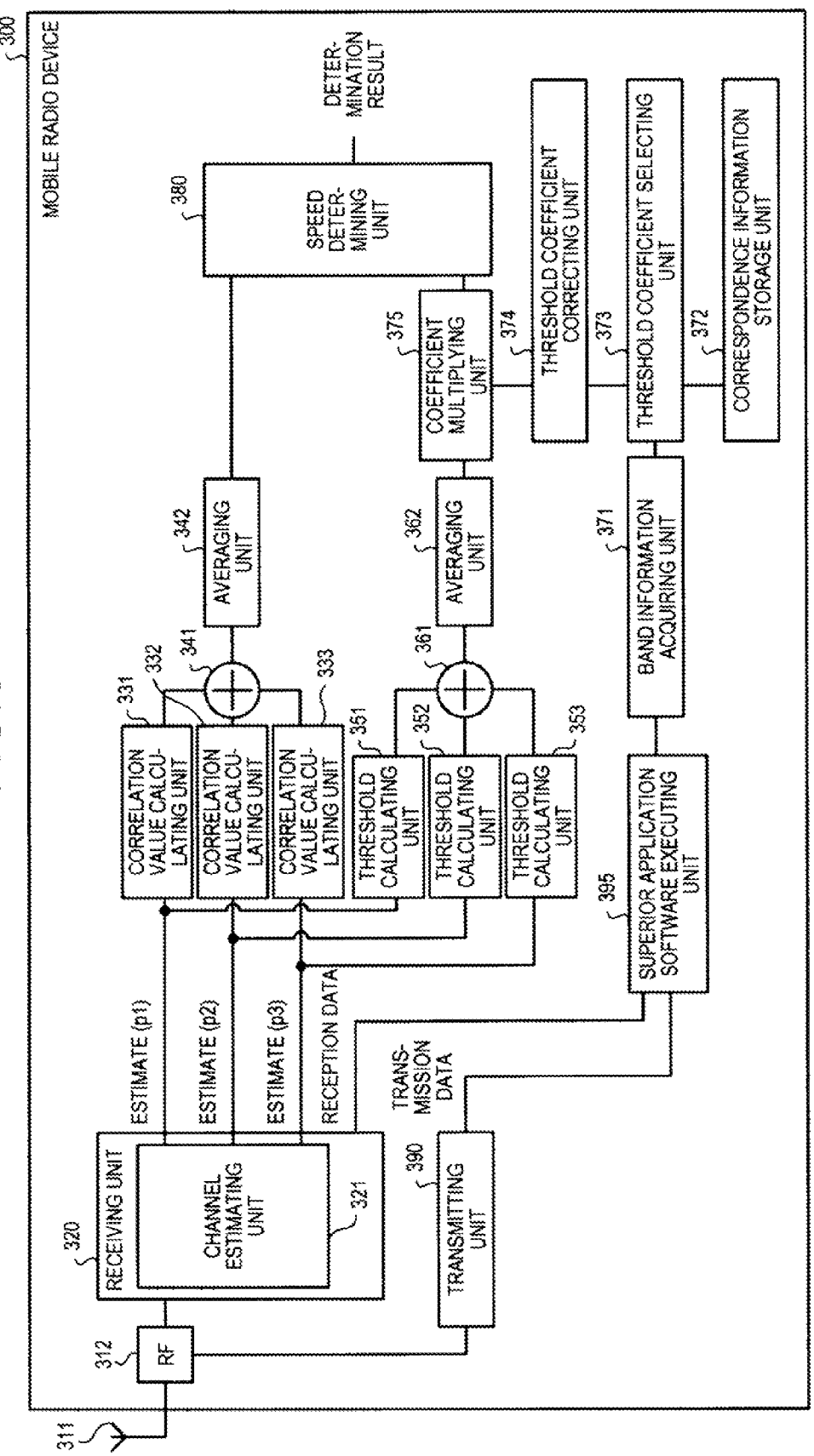

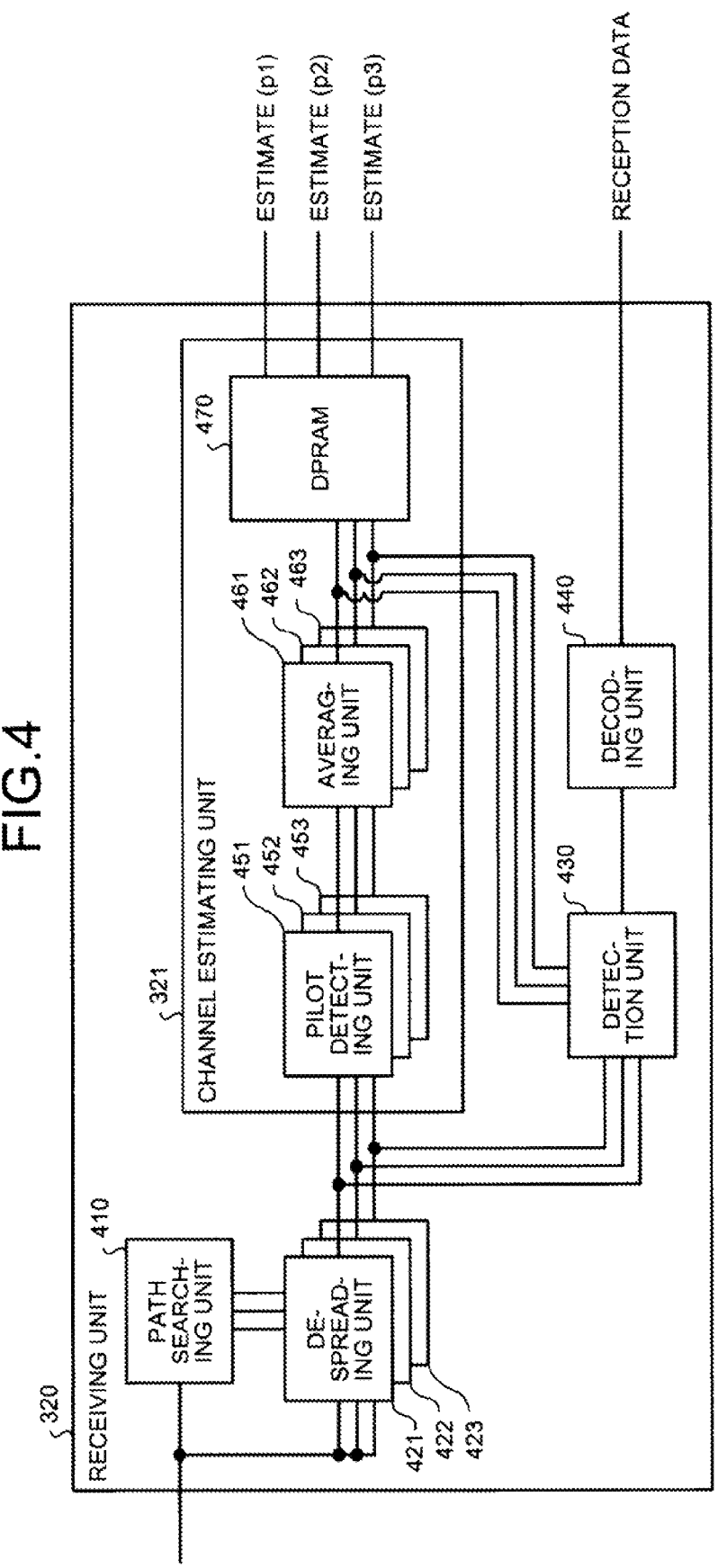

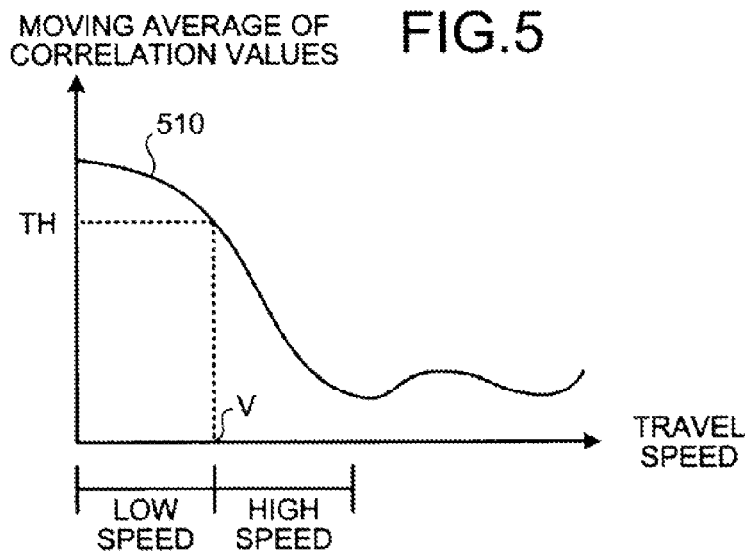
FIG.5
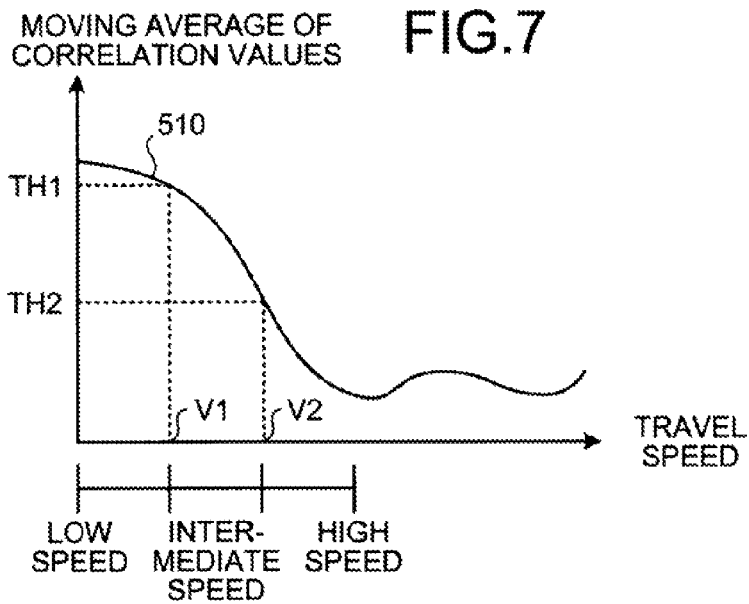
FIG.6
| BAND | 800 [MHz] BAND | 2 [GHz] BAND | 1.7 [GHz] BAND | ... |
|---|---|---|---|---|
| THRESHOLD COEFFICIENT a | 0.7 | 0.6 | 0.65 | ... |
FIG.7

| BAND | 800 [MHz] BAND | 2 [GHz] BAND | 1.7 [GHz] BAND | ... |
|---|---|---|---|---|
| THRESHOLD COEFFICIENT a1 | 0.9 | 0.8 | 0.85 | ... |
| THRESHOLD COEFFICIENT a2 | 0.6 | 0.4 | 0.5 | ... |

START
↓
S901 ACQUIRE BAND INFORMATION
↓
S902 SELECT THRESHOLD COEFFICIENT CORRESPONDING TO BAND
↓
S903 CORRECT THRESHOLD COEFFICIENTS BY SIMPLE MOVING AVERAGE
↓
S904 MULTIPLY REFERENCE THRESHOLD BY CORRECTED THRESHOLD COEFFICIENT
↓
S905 DETERMINE TRAVEL SPEED

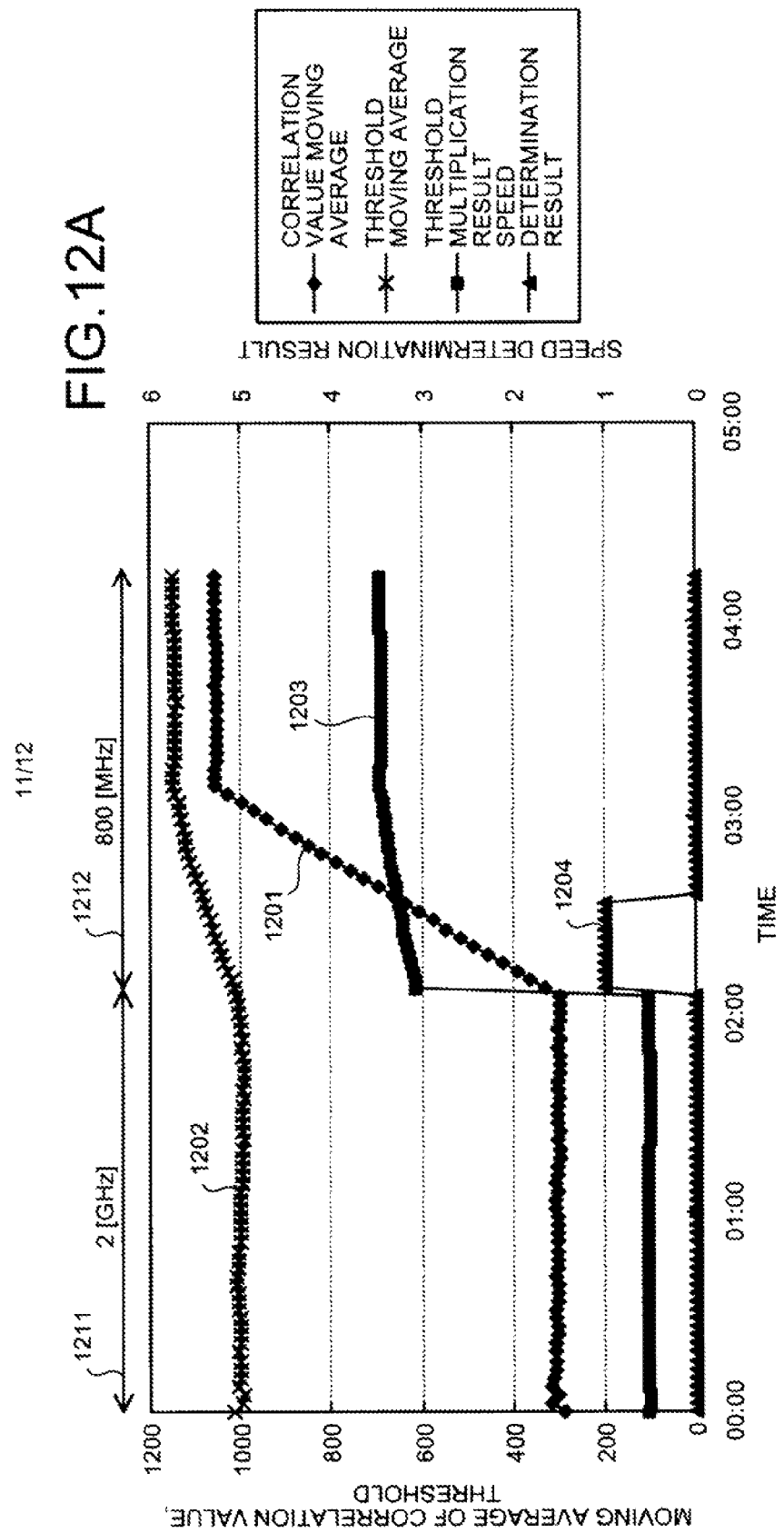

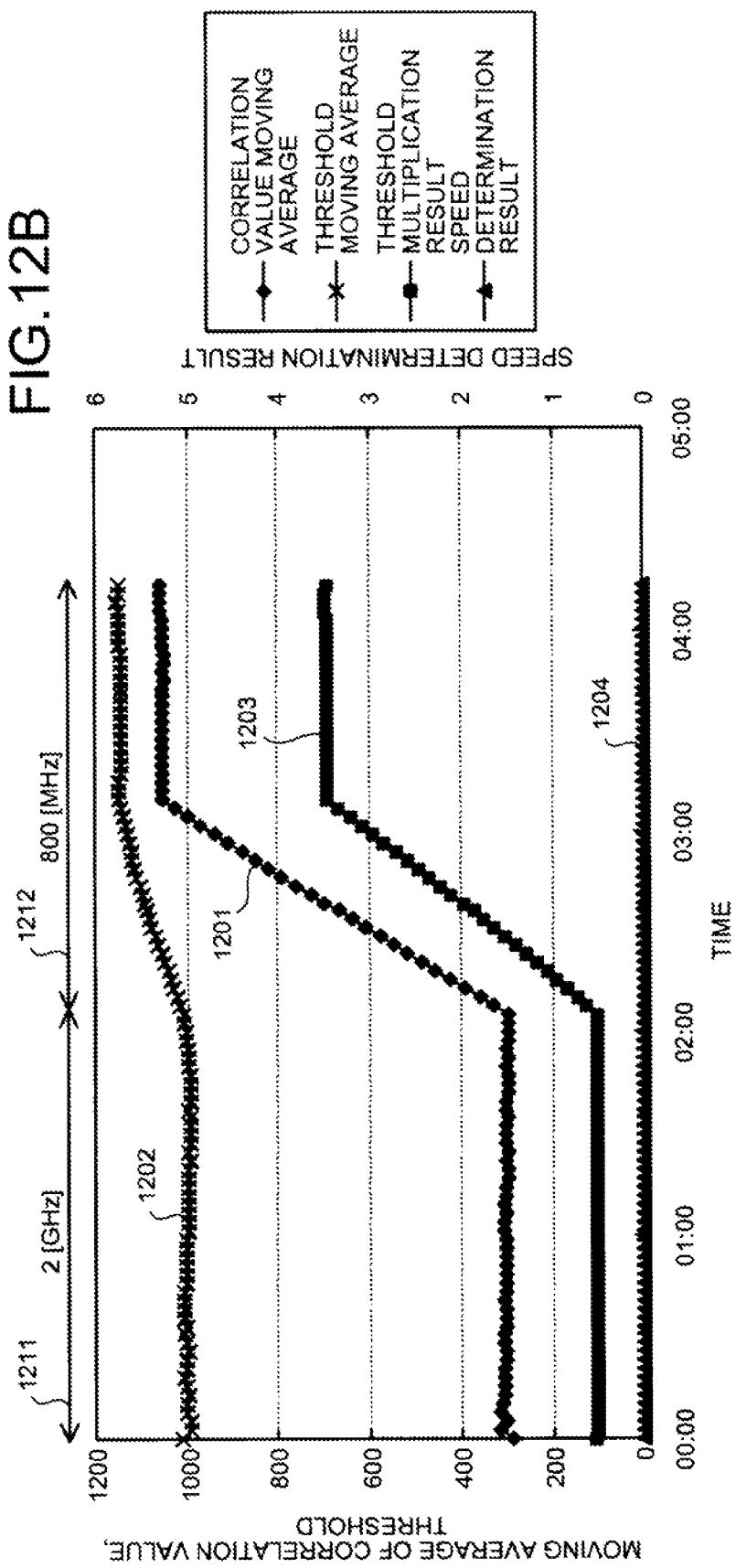

MOBILE RADIO DEVICE AND DETERMINING METHOD

CROSS REFERENCE TO RELATED APPLICATIONS

This application is based upon and claims the benefit of priority of the prior Japanese Patent Application No. 2012-062394, filed on Mar. 19, 2012, the entire contents of which are incorporated herein by reference.

FIELD

The embodiments discussed herein are related to a mobile radio device and a determining method.

BACKGROUND

According to known conventional technologies for a radio communication system, the travel speed of a communication terminal is detected based on a channel estimate (see, e.g., Japanese Laid-Open Patent Publication Nos. 2008-278076, 2008-300923, 2006-74265, and 2006-33207). For example, Japanese Laid-Open Patent Publication No. 2008-278076 discloses a technique of detecting reception levels of multiple known signals transmitted by a communication destination device in respectively different periods and acquiring propagation path variation information according to the result of comparison of a difference between reception levels detected for individual known signals with a threshold.

Another technique is known, according to which a mobile terminal controls transmission power based on a moving average of reception levels of pilot signals for multiple time slots from a base station (see, e.g., Published Japanese-Translation of PCT Application, Publication No. 2006/077647). Still another technique is known, according to which a printer calculates a moving average of multiple sample data of duty in order to reduce noise in duty information (see, e.g., Japanese Laid-Open Patent Publication No. H10-138594).

The above conventional techniques, however, pose a problem in that because the characteristics of a channel estimate to the travel speed of the mobile radio device vary depending on the band of a reception signal, the travel speed cannot be determined precisely even if the variation of the channel estimate is compared with a threshold.

SUMMARY

According to an aspect of an embodiment, a mobile radio device capable of receiving a radio signal whose frequency band switches, includes a setting unit that when the frequency band of the radio signal is a first frequency band, sets a first threshold corresponding to the first frequency band, and that when the frequency band switches from the first frequency band to a second frequency band different from the first frequency band, sets for a given period, a third threshold that is between the first threshold and a second threshold corresponding to the second frequency band and subsequently sets the second threshold; and a determining unit that determines a travel speed of the mobile radio device, based on a comparison of a moving average obtained by temporally accumulating variations of estimates of propagation characteristics of the radio signal and averaging the accumulated variations by a moving average method using a threshold set by the setting unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A depicts a first threshold setting example;

FIG. 2B depicts a second threshold setting example;

FIG. 2C depicts a third threshold setting example;

FIG. 3 depicts one example of a configuration of the mobile radio device;

FIG. 4 depicts one example of a configuration of a receiving unit;

FIG. 5 depicts one example of characteristics of a moving average of correlation values and a threshold;

FIG. 6 depicts one example of correspondence information indicating the correspondence between bands and threshold coefficients;

FIG. 7 depicts one example of characteristics of a moving average of correlation values and multiple thresholds;

FIG. 12A depicts one reference example of a threshold and a determination result in a case of not correcting a threshold coefficient; and FIG. 12B depicts one example of a threshold and a determination result in a case of correcting a threshold coefficient.

DESCRIPTION OF EMBODIMENTS

Preferred embodiments of a mobile radio device and determining method will be explained with reference to the accompanying drawings.

Figure 1:
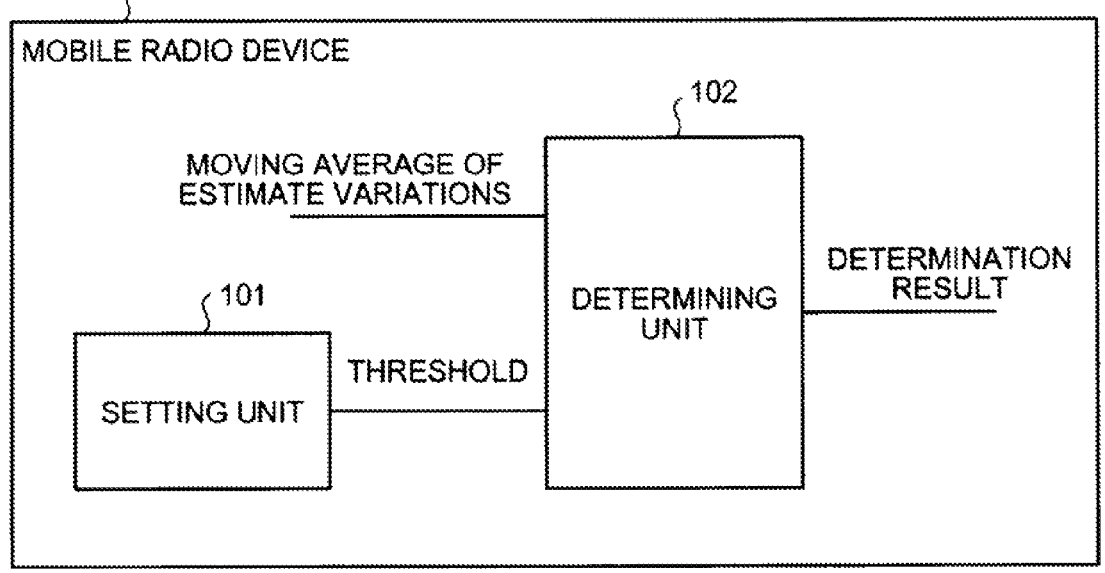
FIG. 1 depicts one example of a mobile radio device according an embodiment.

FIG. 1 depicts one example of a mobile radio device according an embodiment. A mobile radio device 100 of FIG. 1 is, for example, a mobile radio device that can receive from a base station or another mobile radio device, a radio signal whose frequency band changes. As depicted in FIG. 1, the mobile radio device 100 includes a setting unit 101 and a determining unit 102.

The setting unit 101 sets for the determining unit 102, a threshold for determining the travel speed of the mobile radio device 100. The setting unit 101 may set one threshold 102 or may simultaneously set multiple thresholds for the determining unit 102.

The setting unit 101 changes the threshold to be set according to the frequency band of the radio signal that the mobile radio device 100 is receiving. For example, when the frequency band of the radio signal switches, the setting unit 101 sets a third threshold, which between a first threshold and a second threshold, for a given period, based on the first threshold corresponding to a pre-switching frequency band and the second threshold corresponding to a post-switching frequency band. The setting unit 101 then sets the second threshold after the given period is over.

A moving average of estimate variations is input to the determining unit 102. The moving average of estimate variations is the moving average of temporally accumulating variations of estimates of propagation path characteristics (e.g., channel estimates) of radio signals received by the moving transceiver 100. This moving average may be taken, for example, as a simple moving average given by averaging estimate variations weighted with a fixed weight or as a weighted moving average given by averaging estimate variations with a newer estimate variation being weighted with a larger weight.

For example, the mobile radio device 100 includes a receiving unit that receives a radio signal, an estimating unit that derives an estimate of propagation path characteristics based on a signal received by the receiving unit, and a calculating unit that temporally accumulates estimates derived by the estimating unit to take a moving average of the accumulated estimates. The moving average calculated by the calculating unit is input to the determining unit 102.

The determining unit 102 determines the travel speed of the mobile radio device 100 based on a comparison of the input moving average of estimate variations and the threshold set by the setting unit 101. The determining unit 102 outputs a determination result for the travel speed of the mobile radio device 100.

When the setting unit 101 sets one threshold TH, the determining unit 102 determines the travel speed of the mobile radio device 100 on two levels, based on, for example, a size comparison of the input moving average and the threshold TH. For example, the determining unit 102 determines the travel speed to be "low speed" when the moving average is greater than or equal to the threshold TH, and to be "high speed" when the moving average is less than the threshold TH.

When the setting unit 101 sets two thresholds TH1 and TH2 (TH1>TH2), the determining unit 102 determines the travel speed of the mobile radio device 100 on three levels, based on, for example, a size comparison between an input moving average and the thresholds TH1 and TH2. For example, the determining unit 102 determines the travel speed to be "low speed" when the moving average is greater than or equal to the threshold TH1, to be "intermediate speed" when the moving average is less than the threshold TH1 and greater than or equal to the threshold TH2, and to be "high speed" when the moving average is less than the threshold TH2. When the setting unit 101 sets three or more thresholds, the determining unit 102 may determine the travel speed of the mobile radio device 100 on four or more levels.

The determining unit 102 may give a determination of, for example, "stop" (travel speed=0) and of "travel" (travel speed>0). For example, when the setting unit 101 sets one threshold TH, the determining unit 102 gives a determination of "stopped" when the moving average is greater than or equal to the TH, and a determination of "traveling" when the moving average is less than the TH.

FIG. 2A depicts a first threshold setting example. The horizontal axis in the FIG. 2A indicates temporal transitions. Time t1 on the horizontal axis represents the time at which the frequency band of a radio signal that the mobile radio device 100 is receiving switches from a frequency band A (first frequency band) to a frequency B (second frequency band). A period 211 represents the period during which the frequency band of the radio signal remains the frequency band A. A period 212 represents the period during which the frequency band of the radio signal remains the frequency band B.

A calculation cycle 220 represents cycles of calculation of moving averages of estimate variations that are input to the determining unit 102. The mobile radio device 100 calculates the moving average by, for example, averaging estimate variations within each cycle represented by the calculation cycle 220. A time length L represents the length of each cycle represented by the calculation cycle 220, i.e., the length of the period for which the moving average is calculated.

A threshold 230 represents a threshold that is set for the determining unit 102, by the setting unit 101. A threshold TH_A (first threshold) is a threshold corresponding to the frequency band A. A threshold TH_B (second threshold) is a threshold corresponding to the frequency band B. As indicated by the threshold 230, the setting unit 101 sets the threshold TH_A for the determining unit 102 in the period 211 during which the radio signal frequency band is the frequency band A.

When the radio signal switches from the frequency band A to the frequency band B at the time t1, the setting unit 101 sets a threshold (third threshold) between the threshold TH_A and the threshold TH_B for the determining unit 102 during a given period T1. After the given period is over, the setting unit 101 sets the threshold TH_B for the determining unit 102.

The length of the given period T1 is, for example, equivalent to the time length L of each calculation cycle 220. In this manner, after the time t1, the threshold 230 can be set to the threshold between the threshold TH_A and the threshold TH_B during a period in which a moving average of estimate variations is affected by the frequency band A.

For example, although moving averages calculated during calculation cycles 221 to 223 among the calculation cycles 220 are calculated during the period 212 in which the radio signal frequency band is the frequency band B, the calculated moving averages include estimate variations in the frequency band A. Because of this, for example, in an assumed case where the threshold 230 switches from the threshold TH_A to the threshold TH_B instantaneously at the time t1, the moving averages including estimate variations in the frequency band A at the calculation cycles 221 to 223 are compared with the threshold TH_B corresponding to the frequency band B. As a result, a possibility of erroneous determination of the travel speed by the determining unit 102 increases (see, e.g., FIG. 12A).

However, by determining the length of the given period T1 to be equivalent to the time length L, the travel speed can be determined based on the threshold between the threshold TH_A and the threshold TH_B during a period of calculation of the moving averages including estimate variations in the frequency band A at the calculation cycles 221 to 223, thereby lowering the possibility of erroneous determination of the travel speed by the determining unit 102.

The given period T1 may be shorter than the time length L. In this case, the rate of estimate variations in the frequency band A included in the moving averages to be compared with the threshold TH_B corresponding to the frequency band B can also be reduced, which, therefore, lowers the possibility of erroneous determination of the travel speed by the determining unit 102. In other words, it suffices for the given period T1 to have a length that allows the determining unit 120 to compare the threshold 230 in the given period T1 with a moving average at least once (the length equal to or longer than one determination cycle of the determining unit 102).

In the example of FIG. 2A, the setting unit 101 sets the threshold 230 in the given period T1 to a threshold that changes linearly from the threshold TH_A to the threshold TH_B. Such an example of setting the threshold 230, which changes linearly from the threshold TH_A to the threshold TH_B, may be applied to a case where a moving average of estimate variations is calculated by the simple moving average method of averaging estimate variations weighted with a fixed weight and thereby allows the threshold 230 to be brought closer to the threshold TH_B pursuant to an increase in the influence of estimate variations on the moving average for the period 212 in which the radio signal frequency band is the frequency band B. Hence, the possibility of erroneous determination of the travel speed by the determining unit 102 can be further lowered.

FIG. 2B depicts a second threshold setting example. In FIG. 2B, constituent elements identical to those described in FIG. 2A are denoted by the same reference numerals used in FIG. 2A and are omitted in further description. As depicted in FIG. 2B, the setting unit 101 may set the threshold 230 in the given period T1 to a threshold that logarithmically changes from the threshold TH_A to the threshold TH_B. In the example of the FIG. 2B, the relation of the threshold 230 with the temporal transition is expressed as a logarithmic function in the given period T1.

The setting second example of FIG. 2B may be applied to a case where a moving average of estimate variations is calculated by the weighted moving average method in which an older estimate variation is weighted with less weight, thereby allowing the threshold 230 to be brought closer to the threshold TH_B pursuant to an increase in the influence of estimate variations on the moving average in the period 212 in which the radio signal frequency band is the frequency band B. Hence, the possibility of erroneous determination of the travel speed by the determining unit 102 can be further lowered.

FIG. 2C depicts a third threshold setting example. In FIG. 2C, constituent elements identical to those described in FIG. 2A are denoted by the same reference numerals and are omitted in further description. As depicted in FIG. 2C, the setting unit 101 may set the threshold 230 in the given period T1 to a threshold that changes stepwise from the threshold TH_A to the threshold TH_B. In the setting third example of the FIG. 2C, the processing volume for calculation of the threshold 230 during the given period T1 can be reduced.

FIG. 3 depicts one example of a configuration of the mobile radio device. A mobile radio device 300 of FIG. 3 is a configuration example of the mobile radio device 100 of FIG. 1. The mobile radio device 300 includes an antenna 311, an RF processing circuit 312, a receiving unit 320, correlation value calculating units 331 to 333, an adder 341, an averaging unit 342, threshold calculating units 351 to 353, an adder 361, and an averaging unit 362. The mobile radio device 300 also includes a band information acquiring unit 371, a correspondence information storage unit 372, a threshold coefficient selecting unit 373, a threshold coefficient correcting unit 374, a coefficient multiplying unit 375, a speed determining unit 380, a transmitting unit 390, and a superior application software executing unit 395.

The setting unit 101 of FIG. 1 can be implemented by, for example, the threshold calculating units 351 to 353, the adder 361, the averaging unit 362, the band information acquiring unit 371, the correspondence information storage unit 372, the threshold coefficient selecting unit 373, the threshold coefficient correcting unit 374, and the coefficient multiplying unit 375. The determining unit 102 of FIG. 1 can be implemented by, for example, the speed determining unit 380.

The antenna 311 receives a radio signal, and outputs the received signal to the RF processing circuit 312. The antenna 311 transmits a transmission signal output from the RF processing circuit 312, in the form of a radio signal.

The RF processing circuit 312 converts the reception signal output from the antenna 311, from a radio frequency (RF) signal to a base band signal. The RF processing circuit 312 outputs to the receiving unit 320, the reception signal converted into the base band signal.

The RF processing circuit 312 converts a transmission signal output from the transmitting unit 390, from a base band signal to an RF signal. The RF processing circuit 312 outputs to the receiving unit 311, the transmission signal converted into the RF signal.

The receiving unit 320 executes a reception process on the reception signal output from the RF processing circuit 312 (see, e.g., FIG. 4). The receiving unit 320 outputs to the superior application software executing unit 395, reception data acquired through the reception process. The receiving unit 320 has a channel estimating unit 321 (see, e.g., FIG. 4). Based on the reception signal output from the RF processing circuit 312, the channel estimating unit 321 calculates an estimate (channel estimate) of propagation path characteristics (e.g., attenuation rate, phase rotation rate, etc.) for each path included in the reception signal.

In the example of FIG. 3, the reception signal of the mobile radio device 300 includes paths p1 to p3 and thus, the channel estimating unit 321 calculates an estimate of propagation path characteristics for the paths p1 to p3. The channel estimating unit 321 outputs an estimate for the path p1 to the correlation value calculating unit 331 and to the threshold calculating unit 351, outputs an estimate for the path p2 to the correlation value calculating unit 332 and to the threshold calculating unit 352, and outputs an estimate for the path p3 to the correlation value calculating unit 333 and to the threshold calculating unit 353.

The correlation value calculating unit 331 calculates a correlation value indicative of a variation of an estimate for the path p1 output from the channel estimating unit 321. The correlation value calculating unit 332 calculates a correlation value indicative of the variation of an estimate for the path p2, output from the channel estimating unit 321. The correlation value calculating unit 333 calculates a correlation value indicative of the variation of an estimate for the path p3 output from the channel estimating unit 321. For example, each of the correlation value calculating units 331 to 333 can calculate the correlation value through calculation using equation (1).

$$\text{correlation value} = I(x) \times I(x+i) + Q(x) \times Q(x+i) \quad (1)$$

In equation (1), x denotes a measurement slot for measuring the variation of an estimate, $I(x)$ denotes the I component of an estimate output from the channel estimating unit 321 in the measurement slot x, $Q(x)$ denotes the Q component of an estimate output from the channel estimating unit 321 in the measurement slot x, and I denotes an interval between measurement slots.

Consequently, each of the correlation value calculating units 331 to 333 can calculate the correlation value through calculation of the inner product (moving variation) of an estimate in the measurement slot x and an estimate in the measurement slot x+1 following the measurement slot x. However, correlation value calculation by the correlation value calculating units 331 to 333 is not limited to calculation of inner products, but may be performed through various methods, such as calculation of amplitude variance. The correlation value calculating units 331 to 333 output the calculated correlation value to the adder 341, respectively.

The adder 341 sums the correlation values output from the correlation value calculating units 331 to 333, for the paths p1 to p3. Through this process, correlation values for multiple paths are synthesized, by which reliability is improved. The adder 341 outputs the sum of the correlation values to the averaging unit 342.

The averaging unit 342 calculates a moving average of correlation values output from the adder 341. Through this process, the correlation values are smoothed, by which a signal-to-noise ratio (SNR) and reliability are improved. In calculation of the moving average by the averaging unit 342, the length of a period for taking an average may be determined to be, for example, the length of 22 samples, i.e., the measurement slot interval i×22. The averaging unit 342 outputs the calculated moving average of correlation values to the speed determining unit 380.

The threshold calculating unit 351 calculates a reference threshold (e.g., reference phase, reference power, etc.), based on an estimate output from the channel estimating unit 321, for the path p1. The threshold calculating unit 352 calculates a reference threshold, based on an estimate output from the channel estimating unit 321, for the path p2. The threshold calculating unit 353 calculates a reference threshold, based on an estimate output from the channel estimating unit 321, for the path p3. For example, each of the threshold calculating units 351 to 353 can calculate the reference threshold through equation (2).

$$\text{reference threshold} = \text{SQRT}[\{I(x)^2 + Q(x)^2\} \times \{I(x+i)^2 + Q(x+i)^2\}] \quad (2)$$

In equation (2), x denotes the measurement slot for measuring the variation of an estimate, $I(x)$ denotes the I component of an estimate output from the channel estimating unit 321 in the measurement slot x, $Q(x)$ denotes the Q component of an estimate output from the channel estimating unit 321 in the measurement slot x, i denotes the interval between measurement slots, and SQRT denotes a square root.

Thus, each of the threshold calculating units 351 to 353 can calculate the reference threshold through calculation of the variation of the amplitude of an estimate output from the channel estimating unit 321. However, reference threshold calculation by the threshold calculating units 351 to 353 is not limited to calculation using equation (2) above and may be performed using various methods. The threshold calculating units 351 to 353 output the calculated reference threshold to the adder 361, respectively.

The adder 361 sums thresholds output from the threshold calculating units 351 to 353, whereby thresholds for multiple paths are synthesized, by which reliability is improved. The adder 361 outputs the sum of the thresholds to the averaging unit 362.

The averaging unit 362 calculates a moving average of the thresholds output from the adder 361, whereby the thresholds are smoothed, by which the SNR and reliability are improved. In calculation of the moving average by the averaging unit 362, the length of the period for which an average is calculated may be determined to be, for example, equal to a period for taking an average in calculation of the moving average by the averaging unit 342. The averaging unit 362 outputs the calculated moving average of thresholds to the coefficient multiplying unit 375.

The band information acquiring unit 371 acquires band information indicative of the band (frequency band) of a reception signal that the mobile radio device 300 is receiving. For example, band information acquiring unit 371 can acquire band information from the superior application software executing unit 395. The band information acquiring unit 371 outputs the acquired band information to the threshold coefficient selecting unit 373.

Figures 8, 9:
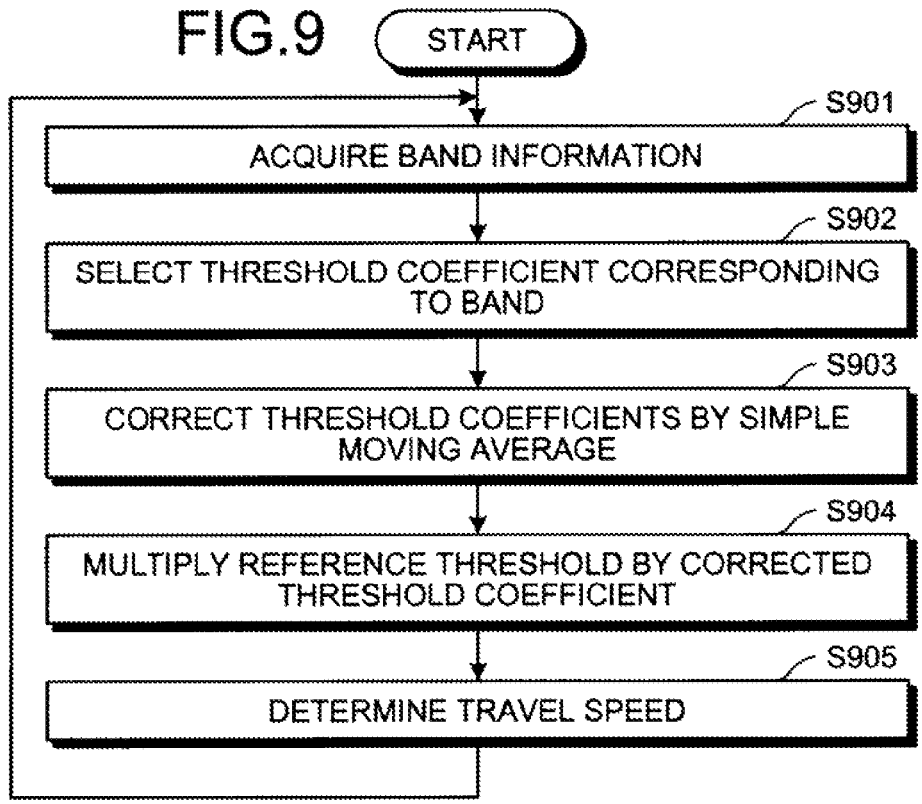
FIG. 8 depicts one example of correspondence information indicating the correspondence between bands and multiple threshold coefficients.
FIG. 9 is a flowchart of a first example of operation by the mobile radio device.

The correspondence information storage unit 372 stores therein information of the correspondence between the bands of reception signals and threshold coefficients (see, e.g., FIGS. 6 and 8). The threshold coefficient selecting unit 373 selects from correspondence information stored in the correspondence information storage unit 372, a threshold coefficient corresponding to the band indicated by band information output from the band information acquiring unit 371. The threshold coefficient selecting unit 373 outputs the selected threshold coefficient to the threshold coefficient correcting unit 374.

The threshold coefficient correcting unit 374 corrects the threshold coefficient output from the threshold coefficient selecting unit 373 and outputs the corrected threshold coefficient to the coefficient multiplying unit 375. For example, the threshold coefficient correcting unit 374 temporally accumulates threshold coefficients output from the threshold coefficient selecting unit 373 and calculates a moving average of the accumulated threshold coefficients. The threshold coefficient correcting unit 374 then outputs the calculated moving average as a corrected threshold coefficient, to the coefficient multiplying unit 375 (see, e.g., FIGS. 9 and 10).

The coefficient multiplying unit 375 multiplies a moving average of the reference threshold output from the averaging unit 362, by a threshold coefficient output from the threshold coefficient correcting unit 374. The coefficient multiplying unit 375 outputs to the speed determining unit 380, the result of the multiplication as a threshold for determining the speed.

In this manner, based on the correspondence information indicative of threshold coefficients correlated with individual bands, when a reception signal frequency band is a first band, the mobile radio device 300 sets the first threshold derived by using a first coefficient corresponding to the first band. When the reception signal switched from the first band to a second band, the mobile radio device 300 sets for a given period, the third threshold derived by using a third coefficient that is between the first coefficient and a second coefficient corresponding to the second band. After the given period is over, the mobile radio device 300 sets the second threshold derived by using the second coefficient.

In this manner, a threshold can be changed depending on the band of a reception signal. When the band of the reception signal switches, the third threshold between the first threshold corresponding to a pre-switching band and the second threshold corresponding to a post-switching band is set for the given period and then the second threshold is set after the given period is over, thereby improving the accuracy of determination of the travel speed of the mobile radio device 300 by the speed determining unit 380.

The mobile radio device 300 can normalize a threshold based on the amplitude of an estimate of propagation path characteristics through processing by the threshold calculating units 351 to 353, the adder 361, and the averaging unit 362 to further improve the accuracy of determination of the travel speed of the mobile radio device 300 by the speed determining unit 380.

The speed determining unit 380 determines the travel speed of the mobile radio device 300, based on a size comparison of a moving average of correlation values output from the averaging unit 342 and a threshold output from the coefficient multiplying unit 375. The averaging unit 342 outputs information indicative of the result of travel speed determination.

For example, the mobile radio device 300 may have a control unit that controls a cycle of intermittent reception for measuring reception quality based on information indicative of the result of travel speed determination output from the speed determining unit 380. The mobile radio device 300 may have a control unit that controls an interval of automatic frequency control (AFC), etc., based on information indicative of the result of travel speed determination output from the speed determining unit 380. This allows the mobile radio device 300 to accurately determine its travel speed, leading to, for example, a reduction in power consumption and an improvement in reception performance.

Transmission data from the superior application software executing unit 395 is input to the transmitting unit 390. Based on the input transmission data, the transmitting unit 390 generates a transmission signal having the baseband frequency. The transmitting unit 390 outputs the generated transmission signal to the RF processing circuit 312.

The superior application software executing unit 395 executes superior application software. The superior application software executed by the superior application software executing unit 395 generates transmission data to be transmitted by the transmitting unit 390, and outputs the generated transmission data to the transmitting unit 390. The superior application software executed by the superior application software executing unit 395 also executes a process based on reception data output from the receiving unit 320. The superior application software executed by the superior application software executing unit 395 may detect a shift in the band of a reception signal of the mobile radio device 300 and output to the band information acquiring unit 371, band information based on the result of the detection based on the reception data.

In this manner, the mobile radio device 300 correlates channel estimates acquired from reception signals with thresholds corresponding to bands at the acquisition of the channel estimates and temporally accumulates the correlated channel estimates and thresholds. The mobile radio device 300 then determines its travel speed, using a moving average calculated from the accumulated channel estimates and a moving average calculated from the accumulated thresholds.

The receiving unit 320, the correlation value calculating units 331 to 333, the adder 341, the averaging unit 342, the threshold calculating units 351 to 353, and the adder 361 can be implemented by, for example, a calculating unit, such as field programmable gate array (FPGA). Each of the averaging unit 362, the band information acquiring unit 371, the threshold coefficient selecting unit 373, the threshold coefficient correcting unit 374, the coefficient multiplying unit 375, the speed determining unit 380, and the transmitting unit 390 can be implemented by a calculating unit, such as FPGA.

The correspondence information storage unit 372 can be implemented by, for example, a non-volatile memory, such as a magnetic disk and flash memory. The superior application software executing unit 395 can be realized by, for example, a computing unit, such as central processing unit (CPU).

FIG. 4 depicts one example of a configuration of the receiving unit. The receiving unit 320 of FIG. 3 includes, for example, a path searching unit 410, despreading units 421 to 423, a detection unit 430, a decoding unit 440, and a channel estimating unit 321, as depicted in FIG. 4.

The path searching unit 410 detects paths differing in propagation delay time, based on a reception signal output from the RF processing circuit 312 (see, e.g., FIG. 3). In the examples of FIGS. 3 and 4, the path searching unit 410 detects three paths including the paths p1 to p3. The path searching unit 410 reports each of the detected paths to each of the despreading units 421 to 423.

The despreading unit 421 executes a despreading process on a reception signal output from the RF processing circuit 312, for the path p1 reported from the path searching unit 410. The despreading unit 422 executes the despreading process on the reception signal output from the RF processing circuit 312, for the path p2 reported from the path searching unit 410. The despreading unit 423 executes the despreading process on the reception signal output from the RF processing circuit 312, for the path p3 reported from the path searching unit 410. Each of the despreading units 421 to 423 outputs to the detection unit 430 and to the channel estimating unit 321, a series of signals acquired through the despreading process.

The detection unit 430 performs detection based on the series of signals output from the despreading units 421 to 423 and on an estimate of propagation path characteristics output from the channel estimating unit 321 and thereby, generates a reception symbol. The detection unit 430 outputs the generated symbol to the decoding unit 440. The decoding unit 440 decodes the reception symbol output from the detection unit 430. The decoding unit 440 may use a turbo Viterbi decoding method to execute the decoding. The decoding unit 440 outputs to the superior application software executing unit 395, reception data acquired by the decoding (see, e.g., FIG. 3).

The channel estimating unit 321 has pilot detecting units 451 to 453, averaging units 461 to 463, and a DPRAM 470. The pilot detecting units 451 to 453 detect pilot signals included in the series of signals output from the despreading units 421 to 423, respectively. The pilot detecting units 451 to 453 output the detected pilot signals to the averaging units 461 to 463, respectively.

The averaging units 461 to 463 calculate moving averages of pilot signals output from the pilot detecting units 451 to 453, respectively and thereby, calculate estimates of the propagation path characteristics (e.g., attenuation rate and phase rotation rate) of the paths p1 to p3, respectively. The averaging units 461 to 463 each output the calculated estimate to the DPRAM 470 and to the detection unit 430.

The dual port random access memory (DPRAM) 470 stores therein estimates of the characteristics of the paths p1 to p3 output from the averaging units 461 to 463. The estimate of the characteristics of the path p1 stored in the DPRAM 470 is output to the correlation value calculating unit 331 and to the threshold calculating unit 351 (see, e.g., FIG. 3). The estimate of the characteristics of the path p2 stored in the DPRAM 470 is output to the correlation value calculating unit 332 and to the threshold calculating unit 352 (see, e.g., FIG. 3). The estimate of the characteristics of the path p3 stored in the DPRAM 470 is output to the correlation value calculating unit 333 and to the threshold calculating unit 353 (see, e.g., FIG. 3).

A case where the speed determining unit 380 determines the travel speed of the mobile radio device 300 on two levels to be "high speed" and to be "low speed" will be described.

FIG. 5 depicts one example of the characteristics of a moving average of correlation values and a threshold. The horizontal axis of FIG. 5 represents the travel speed of the mobile radio device 300. The vertical axis of FIG. 5 represents the moving average of correlation values output from the averaging unit 342. A correlation value characteristics curve 510 represents the characteristics of the moving average of correlation values to the travel speed of the mobile radio device 300. A travel speed V on the horizontal axis is a travel speed serving as the boundary between a "high speed" range and a "low speed" range. The threshold TH on the vertical axis is the threshold equivalent to the moving average corresponding to the travel speed V on the correlation value characteristics curve 510.

The speed determining unit 380, for example, determines the travel speed to be "low speed" when the moving average of correlation values output from the averaging unit 342 is greater than or equal to the threshold TH, and determines the travel speed to be "high speed" when the moving average of correlation values output from the averaging unit 342 is less than the threshold TH.

The correlation value characteristics represented by the correlation value characteristics curve 510 vary depending on the band of a reception signal of the mobile radio device 300. To deal with this, in the mobile radio device 300, a threshold coefficient is selected according to the band of the reception signal, so that the threshold TH corresponding to the band of the reception signal is set.

FIG. 6 depicts one example of correspondence information indicating the correspondence between bands and threshold coefficients. The correspondence information storage unit 372 of FIG. 3 stores therein, for example, correspondence information 600 shown in FIG. 6. The correspondence information 600 correlates each value of a threshold coefficient a (0.7, 0.6, 0.65, . . . ) for calculating the threshold TH, based on which the determination of "high speed" or "low speed" made, with each of the bands of reception signals of the mobile radio device 300 (800 [MHz], 2 [GHz], 1.7 [GHz], . . . ).

The threshold coefficient selecting unit 373 selects from the correspondence information 600, a threshold coefficient a corresponding to a band indicated by band information output from the band information acquiring unit 371. For example, when the band indicated by the band information is 800 [MHz], the threshold coefficient selecting unit 373 selects a threshold coefficient a of 0.7.

For example, a designer measures the correlation value characteristics curve 510 of FIG. 5 for each band, and determines based on the correlation value characteristics curve 510 measured for each band, the threshold TH for each band corresponding to the travel speed V serving as the boundary between "high speed" and "low speed". The designer then determines for each band, a threshold coefficient a to be used by the coefficient multiplying unit 375 to calculate the threshold TH measured for each band. In this manner, the designer can make the corresponding information 600.

A case where the speed determining unit 380 determines the travel speed of the mobile radio device 300 on three levels to be "high speed", "intermediate speed", and "low speed" will be described. In this case, for example, two threshold coefficients a1 and a2 are input to the coefficient multiplying unit 375. The coefficient multiplying unit 375 multiplies each of the threshold coefficients a1 and a2 by the moving average of reference thresholds from the averaging unit 362 to produce two thresholds TH1 and TH2. The speed determining unit 380 compares the size of the moving average of correlation values from the averaging unit 342 and the size of the two thresholds TH1 and TH2 and thereby, determines the travel speed of the mobile radio device 300 on three levels.

FIG. 7 depicts one example of the characteristics of a moving average of correlation values and multiple thresholds. In FIG. 7, constituent elements identical to those described in FIG. 5 are denoted by the same reference numerals used in FIG. 5 and are omitted in further description. A travel speed V1 on the horizontal axis is a travel speed serving as the boundary between the "low speed" range and the "intermediate speed" range. A travel speed V2 on the horizontal axis is a travel speed serving as the boundary between the "intermediate speed" range and the "high speed" range. The threshold TH1 on the vertical axis is the threshold equivalent to the moving average corresponding to the travel speed V1 on the correlation value characteristics curve 510. The threshold TH2 on the vertical axis is the threshold equivalent to the moving average corresponding to the travel speed V2 on the correlation value characteristics curve 510.

The speed determining unit 380, for example, determines the travel speed to be "low speed" when a moving average of correlation values output from the averaging unit 342 is greater than or equal to the threshold TH1, determines the travel speed to be "intermediate speed" when the moving average of correlation values output from the averaging unit 342 is less than the threshold TH1 and greater than or equal to the threshold TH2, and determines the travel speed to be "high speed" when the moving average of correlation values output from the averaging unit 342 is less than the threshold TH2.

In the mobile radio device 300, two threshold coefficients are selected according to the band of the reception signal, so that the thresholds TH1 and TH2 corresponding to the band of the reception signal are set.

FIG. 8 depicts one example of correspondence information indicating the correspondence between bands and multiple threshold coefficients. In FIG. 8, constituent elements identical to those described in FIG. 6 are denoted by the same reference numerals used in FIG. 6 and are omitted in further description. Correspondence information 800 of FIG. 8 may be stored in the correspondence information storage unit 372 of FIG. 3.

The correspondence information 800 correlates each value of a threshold coefficient a1 (0.9, 0.8, 0.85, . . . ) for calculating the threshold TH1, based on which determinations of "low speed" and "intermediate speed" are made, with each of the bands of reception signals of the mobile radio device 300. The correspondence information 800 correlates with the bands of reception signals of the mobile radio device 300, values of a threshold coefficient a2 (0.6, 0.4, 0.5, . . . ) for calculating the threshold TH2, based on the determination of "intermediate speed" and "high speed".

The threshold coefficient selecting unit 373 selects from the correspondence information 800, the threshold coefficients a1 and a2 corresponding to the band indicated by band information output from the band information acquiring unit 371. For example, when a band indicated by the band information is 800 [MHz], the threshold coefficient selecting unit 373 selects the threshold coefficient a1 of 0.9 and the threshold coefficient a2 of 0.6.

For example, the designer measures the correlation value characteristics curve 510 of FIG. 7 for each band, and determines based on the correlation value characteristics curve 510 measured for each band, the threshold TH1 for each band corresponding to the travel speed V1 and the threshold TH2 for each band corresponding to the travel speed V2. The designer then determines for each band, the threshold coefficients a1 and a2 for allowing the coefficient multiplying unit 375 to calculate the threshold TH1 and TH2 measured for each band. In this manner, the designer can make the corresponding information 800.

While a case where the speed determining unit 380 determines the travel speed of the mobile radio device 300 on two levels or three levels is described with reference to FIGS. 5 to 8, the speed determining unit 380 may determine the travel speed of the mobile radio device 300 on four or more levels. For example, when the speed determining unit 380 determines the travel speed on M+1 levels (M denotes an integer of 3 or larger), the correspondence information of the correspondence information storage unit 372 correlates M threshold coefficients with each band.

The threshold coefficient selecting unit 373 selects M threshold coefficients, and the threshold coefficient correcting unit 374 corrects the M threshold coefficients. As a result, the M threshold coefficients are input to the coefficient multiplying unit 375. The coefficient multiplying unit 375 multiplies each of the input M threshold coefficients by the moving average of reference thresholds from the averaging unit 362 to produce M thresholds. The speed determining unit 380 compares the magnitude of the moving average of correlation values from the averaging unit 342 with the magnitudes of M thresholds and thereby, determines the travel speed of the mobile radio device 300 on M+1 levels.

FIG. 9 is a flowchart of a first example of operation by the mobile radio device. For example, the mobile radio device 300 executes the following steps while causing the averaging unit 342 to calculate a moving average of correlation values and the averaging unit 362 to calculate a moving average of reference thresholds.

The band information acquiring unit 371 acquires band information indicative of the band of the current reception signal of the mobile radio device 300 (step S901). Subsequently, the threshold coefficient selecting unit 373 selects a threshold coefficient corresponding to the band indicated by the band information acquired at step S901 (step S902).

Subsequently, the threshold coefficient correcting unit 374 corrects threshold coefficients selected at step S902 by the simple moving average method (step S903). For example, the threshold coefficient correcting unit 374 averages N threshold coefficients selected at the previous N executions of step S902 and weighted with a fixed weight to produce an average value as a corrected threshold coefficient.

The coefficient multiplying unit 375 multiplies a reference threshold output from the averaging unit 362 by the corrected threshold coefficient produced at step S903 (step S904). The speed determining unit 380 determines the travel speed of the mobile radio device 300 based on a size comparison of the moving average of correlation values output from the averaging unit 342 and the threshold acquired by the multiplication at step S904 (step S905), after which the mobile radio device 300 returns to step S901.

Through the steps above, the travel speed can be determined based on a threshold corresponding to the band of the current reception signal of the mobile radio device 300. By temporally accumulating threshold coefficients corresponding to the bands of reception signals and averaging the accumulated threshold coefficients by the simple moving average method to produce a threshold coefficient (third coefficient), when the band switches, the travel speed can be determined based on a threshold linearly interpolated by the process of step S903 during a given period.

The given period is equivalent in length to a period during which an average is taken in execution of the simple moving average method at step S903. For example, the length of the period for which the average is calculated in the execution of the simple moving average method at step S903 can be determined to be equal to a period for which an average is calculated by the averaging units 342 and 362 in the execution of the moving average method. Hence, the length of the given period for which a threshold is linearly interpolated can be determined to be equal to the length of the period for which an average is calculated for obtaining a moving average of estimate variations.

A process executed to linearly interpolate a threshold when the band switches is not limited to a process using the simple moving average method as steps of FIG. 9, but may be executed as various types of processes.

Figure 10:
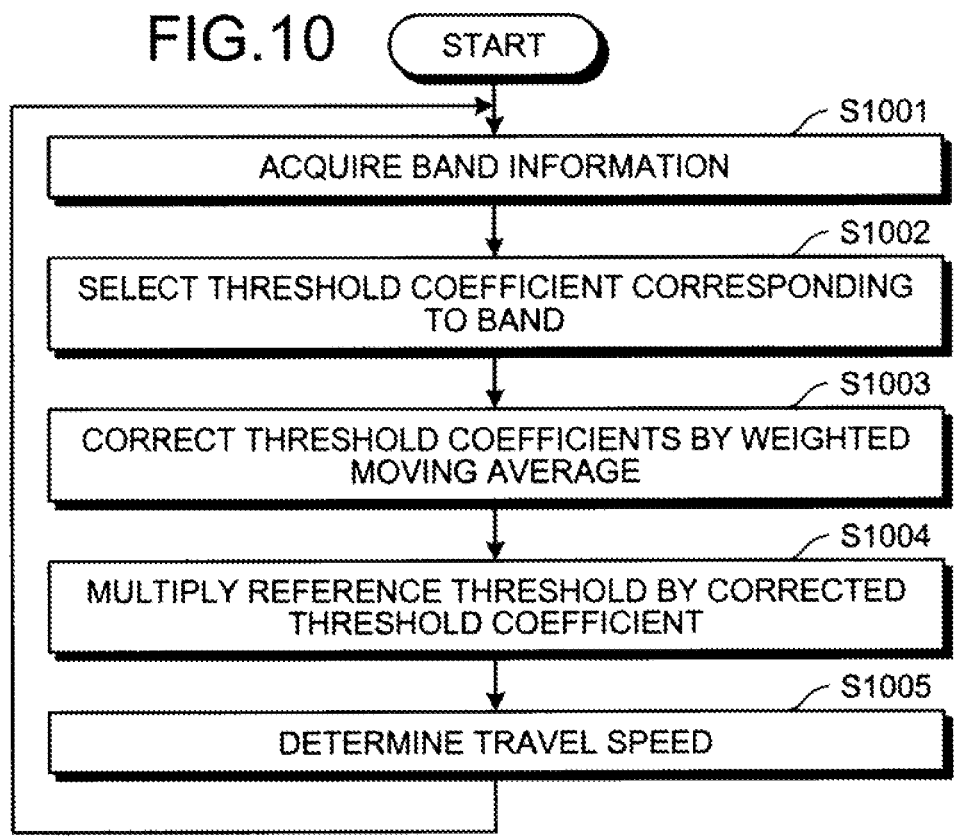
FIG. 10 is a flowchart of a second example of operation by the mobile radio device.

FIG. 10 is a flowchart of a second example of operation by the mobile radio device. For example, the mobile radio device 300 may execute steps of FIG. 10 while causing the averaging unit 342 to calculate a moving average of correlation values and the averaging unit 362 to calculate a moving average of reference thresholds.

Steps S1001, S1002, S1004, and S1005 of FIG. 10 are the same as steps S901, S902, S904, and S905 of FIG. 9. Following step S1002, the threshold coefficient correcting unit 374 corrects threshold coefficients selected at step S1002 by the weighted moving average method (step S1003). For example, the threshold coefficient correcting unit 374 averages N threshold coefficients selected at the previous N executions of step S1002 and weighted with a factor logarithmically increased to be larger for a newer threshold coefficient to produce a weighted average as a corrected threshold coefficient.

Through the steps of FIG. 10, the travel speed can be determined based on a threshold corresponding to the band of the current reception signal of the mobile radio device 300. By temporally accumulating threshold coefficients corresponding to the bands of reception signals and averaging the accumulated threshold coefficients by the weighted moving average method to produce a threshold coefficient (third coefficient), when the band switches, the travel speed can be determined based on a threshold logarithmically interpolated by the process of step S1003 during a given period.

The given period is equivalent in length to a period for which an average is calculated in execution of the weighted moving average method at step S1003. For example, the length of the period for which an average is calculated in execution of the weighted moving average method at step S1003 can be determined to be equal to the period for which an average is calculated by the averaging units 342 and 362 in the execution of the moving average method. Hence, the length of the given period during which a threshold is logarithmically interpolated can be determined to be equal to the length of the period for which the average is calculated for obtaining a moving average of estimate variations.

A process executed to logarithmically interpolate a threshold when the band switches is not limited to a process using the weighted moving average method as steps of FIG. 10, but may be executed as various types of processes.

Figure 11:
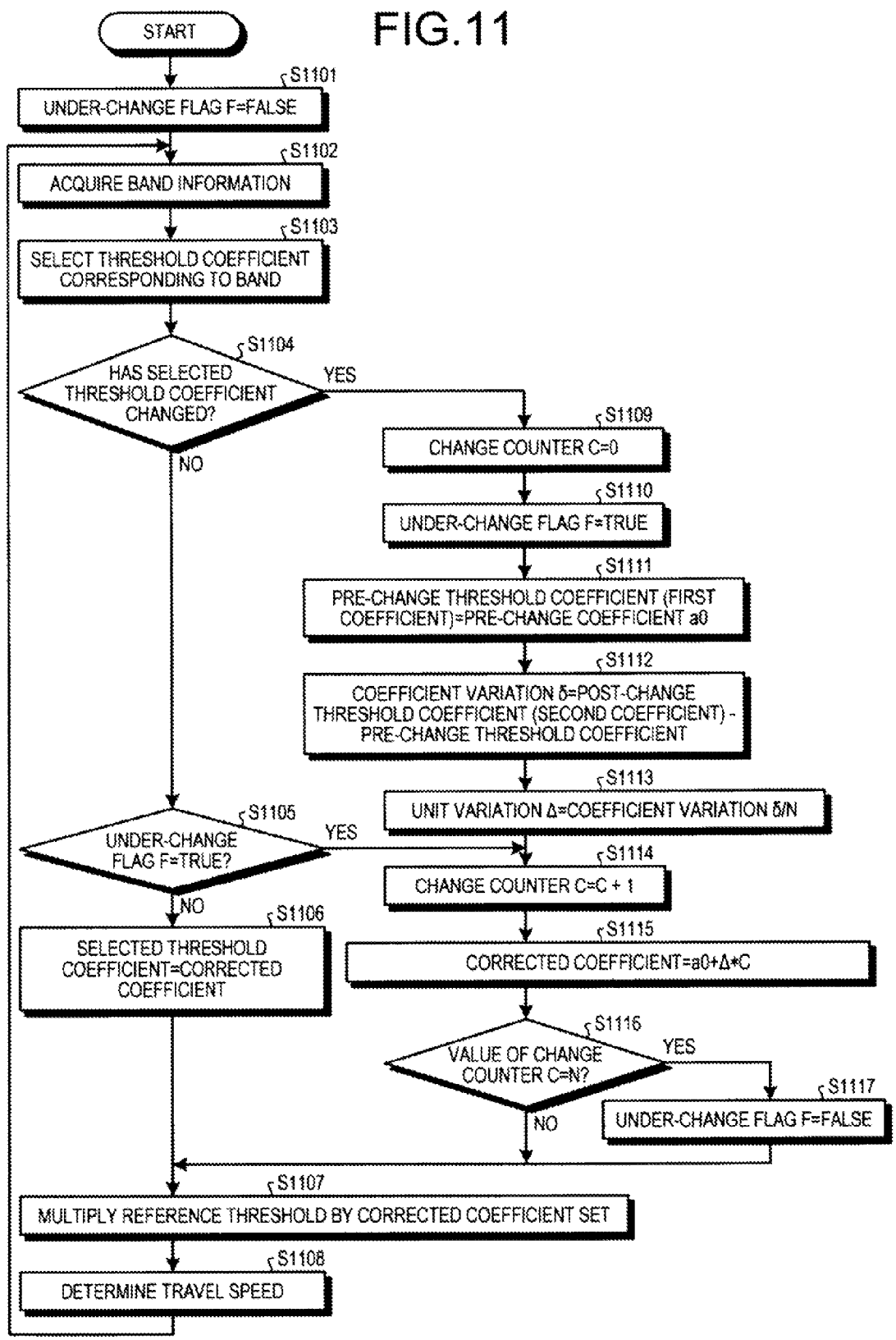
FIG. 11 is a flowchart of a third example of operation by the mobile radio device.

FIG. 11 is a flowchart of a third example of operation by the mobile radio device. For example, the mobile radio device 300 may execute steps of FIG. 11 while causing the averaging unit 342 to calculate a moving average of correlation values and the averaging unit 362 to calculate a moving average of reference thresholds. N in FIG. 11 denotes information indicative of the number of times that the threshold is changed when the band switches. N is a natural number of 2 or larger, and is stored in advance in a memory of the mobile radio device 300.

An under-change flag F is information indicative of whether a changing of the threshold is in progress in response to band switching. A change counter C provides information indicative of the number of times that the threshold changes in response to band switching. A pre-change coefficient a0 is information indicative of a threshold coefficient before band switching. A coefficient variation δ is information indicative of the difference of a pre-change threshold coefficient and a post-change threshold coefficient. A unit variation Δ is information indicative of the amount of change of a threshold per threshold change in response to band switching.

The threshold coefficient correcting unit 374 stores the under-change flag F, the change counter C, the pre-change coefficient a0, the coefficient variation δ, and the unit variation Δ, for example, in the memory of the mobile radio device 300 and refers to the information.

The threshold coefficient correcting unit 374 sets the under-change flag F to false (step S1101). The band information acquiring unit 371 acquires band information indicative of the band of the current reception signal of the mobile radio device 300 (step S1102). The threshold coefficient selecting unit 373 selects a threshold coefficient corresponding to the band indicated by the band information acquired at step S1102 (step S1103).

The threshold coefficient correcting unit 374 determines whether the threshold coefficient selected at step S1103 has changed from the threshold coefficient selected at steps S1103 at the previous cycle (step S1104). If the threshold coefficient has not changed (step S1104: NO), the threshold coefficient correcting unit 374 determines whether the under-change flag F is set to true (step S1105). If the under-change flag F is not set to true (step S1105: NO), the threshold coefficient correcting unit 374 sets the threshold coefficient selected at step S1103 as a corrected coefficient (step S1106).

The coefficient multiplying unit 375 multiplies the reference threshold output from the averaging unit 362 by the corrected coefficient set by threshold coefficient correcting unit 374 (step S1107). The speed determining unit 380 determines the travel speed of the mobile radio device 300 based on a size comparison of a moving average of correlation values output from the averaging unit 342 and the threshold acquired by the multiplication at step S1107 (step S1108), after which the mobile radio device 300 returns to step S1102.

If the selected threshold coefficient has changed at step S1104 (step S1104: YES), the threshold coefficient correcting unit 374 sets the change counter C to 0 (step S1109), sets the under-change flag F to true (step S1110), and sets the pre-change threshold coefficient (first coefficient) as the pre-change coefficient a0 (step S1111). The pre-change threshold coefficient is the threshold coefficient selected at steps S1103 at the previous cycle.

The threshold coefficient correcting unit 374 calculates the coefficient variation δ by subtracting the pre-change threshold coefficient from the post-change threshold coefficient (second coefficient) (step S1112). The post-change threshold coefficient is the threshold coefficient selected at steps S1103 at the current cycle, while the pre-change threshold coefficient is the threshold coefficient selected at steps S1103 at the previous cycle.

Subsequently, the threshold coefficient correcting unit 374 divides the coefficient variation δ calculated at step S1112, by N to calculate the unit variation Δ (step S1113). The threshold coefficient correcting unit 374 increments the value of the change counter C by 1 (step S1114). The threshold coefficient correcting unit 374 calculates a corrected coefficient (third coefficient) (step S1115). For example, the threshold coefficient correcting unit 374 adds to the pre-change coefficient a0 set at step S1111, a value obtained by multiplying the unit variation Δ calculated at step S1113 by the current value of the change counter C and thereby, calculates the corrected coefficient.

The threshold coefficient correcting unit 374 determines whether a value of the change counter C has become equal to N (step S1116). If the value of the change counter C has not become equal to N (step S1116: NO), the mobile radio device proceeds to step S1107. If the value of the change counter C has become equal to N (step S1116: YES), the threshold coefficient correcting unit 374 sets the under-change flag F to false (step S1117), and the mobile radio device proceeds to step S1107.

If the under-change flag F is set to false at step S1105 (step S1105: YES), the mobile radio device 300 proceeds to step S1114.

Through the steps above, the travel speed can be determined based on a threshold corresponding to the band of the current reception signal of the mobile radio device 300. When the band switches, based on a pre-change threshold coefficient and a post-change threshold coefficient, a corrected coefficient (third coefficient) having been changed step by step from the pre-change threshold coefficient to the post-change threshold coefficient during a given period can be calculated. Hence, the travel speed can be determined based on the threshold having been changed step by step during the given period.

The given period is equivalent in length to the period between step S1109 and step S1114 when the value of the change counter C reaches N. For example, the length of the period between step S1109 and step S1114 when the value of the change counter C has not become equal to N reaches N can be determined to be equal to a period for which the average is calculated by the averaging units 342 and 362 in the execution of the moving average method. Hence, the length of the given period during which a threshold is changed step by step can be determined to be equal to the length of a period for which the average is calculated for obtaining a moving average of estimate variations.

A process executed to change a threshold step by step when the band switches is not limited to steps of FIG. 11, but may be executed as various types of processes.

FIG. 12A depicts one reference example of a threshold and a determination result in a case of not correcting a threshold coefficient. FIG. 12B depicts one example of a threshold and a determination result in a case of correcting a threshold coefficient. The horizontal axes in the FIGS. 12A and 12B represent temporal transitions. It is assumed that the travel speed of the mobile radio device 300 is constant during the temporal transitions represented by the horizontal axes in the FIGS. 12A and 12B.

Correlation value moving average 1201 represents the shift of a moving average of correlation values output from the averaging unit 342. Threshold moving average 1202 represents the shift of a moving average of reference thresholds output from the averaging unit 362. Threshold multiplying result 1203 represents the shift of a threshold output from coefficient multiplying unit 375. Speed determination result 1204 represents the shift of a travel speed determination result output from coefficient multiplying unit 375.

Period 1211 represents a period during which the band of a reception signal of the mobile radio device 300 remains 2 [GHz]. Period 1212 represents a period during which the band of a reception signal of the mobile radio device 300 remains 800 [MHz].

Suppose the threshold coefficient correcting unit 374 does not correct the threshold coefficient. In such a case, the threshold multiplying result 1203 changes instantaneously at a point of transition from the period 1211 to the period 1212, as depicted in FIG. 12A. In the example of 12A, at the point of transition from the period 1211 to the period 1212, the threshold multiplying result 1203 increases sharply and temporarily exceeds the correlation value moving average 1201 consequent to the threshold multiplying result 1203 changing instantaneously when the band switches, while the correlation value moving average 1201, which represents the moving average, does not change sharply when the band switches. A phenomenon results where the speed determination result 1204 changes while the travel speed of the mobile radio device 300 does not change at all, which results in an erroneous determination.

In contrast, when the threshold coefficient correcting unit 374 corrects a threshold coefficient, the threshold multiplying result 1203 changes gradually at the point of transition from the period 1211 to the period 1212, as depicted in FIG. 12B. In the example of 12B, the threshold coefficient correcting unit 374 takes a simple moving average of threshold coefficients, which is reflected as linear interpolation on the threshold multiplying result 1203. A gradual change of the threshold multiplying result 1203 at band switching avoids the case where the threshold multiplying result 1203 temporarily exceeds the correlation value moving average 1201 to cause an erroneous determination.

As described, according to the mobile radio device and the determining method, a threshold compared with a moving average of channel estimates for determining the speed of the mobile radio device is set according to a reception band, thereby improving the accuracy of determination of the travel speed. When the reception band switches, a threshold between a pre-switching threshold and a post-switching threshold is set for a given period, thereby reducing erroneous determinations at band switching and further improving the accuracy of determination of the travel speed.

According to one aspect of the present invention, an effect of improving the accuracy of determining a travel speed is achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile radio device capable of receiving a radio signal whose frequency band switches, the mobile radio device comprising:
    a setting unit that when the frequency band of the radio signal is a first frequency band, sets a first threshold corresponding to the first frequency band, and that when the frequency band switches from the first frequency band to a second frequency band different from the first frequency band, sets for a given period, a third threshold that is between the first threshold and a second threshold corresponding to the second frequency band and subsequently sets the second threshold; and
    a determining unit that determines a travel speed of the mobile radio device, based on a comparison of a moving average obtained by temporally accumulating variations of estimates of propagation characteristics of the radio signal and averaging the accumulated variations by a moving average method using a threshold set by the setting unit.

2. The mobile radio device according to claim 1, wherein the given period is equivalent in length to a period for which an average is calculated for obtaining the moving average.

3. The mobile radio device according to claim 1, wherein the given period is of a length of a period during which the determining unit performs a comparison of the moving average and the third threshold at least once.

4. The mobile radio device according to claim 1, wherein the third threshold is a threshold that changes linearly from the first threshold to the second threshold.

5. The mobile radio device according to claim 1, wherein the third threshold is a threshold that changes logarithmically from the first threshold to the second threshold.

6. The mobile radio device according to claim 1, wherein the third threshold is a threshold that changes stepwise from the first threshold to the second threshold.

7. The mobile radio device according to claim 1, wherein the setting unit sets, when the frequency band of the radio signal is the first frequency band, the first threshold derived by using a first coefficient that corresponding to the first frequency band based on correspondence information correlating a coefficient to each of the frequencies, and when the frequency band switches from the first frequency band to the second frequency band, sets for the given period, the third threshold derived by using a third coefficient that is between the first coefficient and a second coefficient that corresponds to the second frequency band, and subsequently sets the second threshold derived by using the second coefficient.

8. The mobile radio device according to claim 7, wherein the third coefficient is a coefficient obtained by temporally accumulating coefficients corresponding to frequency bands of the radio signal and averaging the accumulated coefficients using a length of the given period by a simple moving average method.

9. The mobile radio device according to claim 7, wherein the third coefficient is a coefficient given by temporally accumulating coefficients corresponding to frequency bands of the radio signal and averaging the accumulated coefficients using a length of the given period by a weighted moving average method.

10. The mobile radio device according to claim 7, wherein the third coefficient is a coefficient that is based on the first coefficient and the second coefficient and is changed from the first coefficient to the second coefficient stepwise during the given period.

11. The mobile radio device according to claim 1, wherein the setting unit sets a threshold that is normalized based on an amplitude of an estimate of the propagation characteristics.

12. A determining method of a mobile radio device comprising a setting unit and a determining unit for determining a travel speed of the mobile radio device capable of receiving a radio signal whose frequency band switches, the determining method comprising:
    setting, by the setting unit, when the frequency band of the radio signal is a first frequency band, a first threshold corresponding to the first frequency band, and that when the frequency band switches from the first frequency band to a second frequency band different from the first frequency band, setting for a given period, a third threshold that is between the first threshold and a second threshold corresponding to the second frequency band and subsequently sets the second threshold; and
    determining, by the determining unit, the travel speed of the mobile radio device, based on a comparison of a moving average obtained by temporally accumulating variations of estimates of propagation characteristics of the radio signal and averaging the accumulated variations by a moving average method using a threshold set at the setting.

* * * * *